(12) United States Patent
Wiedenman et al.

(10) Patent No.: US 6,996,645 B1
(45) Date of Patent: Feb. 7, 2006

(54) METHOD AND APPARATUS FOR SPAWNING MULTIPLE REQUESTS FROM A SINGLE ENTRY OF A QUEUE

(75) Inventors: Gregory B. Wiedenman, Woodbury, MN (US); Nathan A. Eckel, Fridley, MN (US)

(73) Assignee: Unisys Corporation, Blue Bell, PA (US)

( * ) Notice: Subject to any disclaimer, the term of this patent is extended or adjusted under 35 U.S.C. 154(b) by 293 days.

(21) Appl. No.: 10/330,830

(22) Filed: Dec. 27, 2002

(51) Int. Cl.
*G06F 13/00* (2006.01)
(52) U.S. Cl. .......................... 710/107; 710/39; 710/52; 710/54; 710/310; 710/263; 711/150
(58) Field of Classification Search ................ 710/107, 710/39, 52, 54, 310, 263; 711/150
See application file for complete search history.

(56) References Cited

U.S. PATENT DOCUMENTS

| | | | | |
|---|---|---|---|---|
| 3,633,181 A * | 1/1972 | Sikorsky | ...................... | 379/131 |
| 4,320,455 A * | 3/1982 | Woods et al. | ................ | 710/200 |
| 4,482,956 A * | 11/1984 | Tallman | ....................... | 710/200 |
| 5,603,005 A * | 2/1997 | Bauman et al. | ............. | 711/124 |
| 5,623,628 A * | 4/1997 | Brayton et al. | ............. | 711/141 |
| 5,829,040 A * | 10/1998 | Son | ............................. | 711/146 |
| 5,832,304 A * | 11/1998 | Bauman et al. | ................ | 710/40 |
| 5,949,980 A * | 9/1999 | Lee et al. | .................... | 710/112 |
| 5,995,967 A * | 11/1999 | Iacobovici et al. | .......... | 707/100 |
| 6,021,467 A * | 2/2000 | Konigsburg et al. | ........ | 711/122 |
| 6,061,764 A * | 5/2000 | Chittor et al. | ............... | 711/141 |
| 6,154,797 A * | 11/2000 | Burns et al. | .................... | 710/52 |
| 6,189,078 B1 * | 2/2001 | Bauman et al. | ............. | 711/156 |
| 6,298,420 B1 * | 10/2001 | Chittor et al. | .............. | 711/147 |
| 6,434,641 B1 * | 8/2002 | Haupt et al. | ................... | 710/54 |
| 6,662,277 B2 * | 12/2003 | Gaither | ........................ | 711/145 |
| 6,751,721 B1 * | 6/2004 | Webb et al. | ................... | 712/10 |
| 6,772,298 B2 * | 8/2004 | Khare et al. | .................. | 711/144 |
| 6,799,254 B2 * | 9/2004 | Oldfield et al. | ............. | 711/151 |
| 6,826,653 B2 * | 11/2004 | Duncan et al. | ............. | 711/141 |
| 6,854,033 B2 * | 2/2005 | Solomon et al. | ................ | 711/3 |
| 2002/0046307 A1 * | 4/2002 | Treggiden | ..................... | 710/52 |
| 2002/0108005 A1 * | 8/2002 | Larson et al. | ................. | 710/52 |
| 2003/0005230 A1 * | 1/2003 | Solomon et al. | ............ | 711/128 |
| 2003/0079068 A1 * | 4/2003 | Barrick | ......................... | 710/52 |
| 2003/0163618 A1 * | 8/2003 | Anand et al. | ................. | 710/52 |

OTHER PUBLICATIONS

Amato, Nancy M., et al., "Checking Linked Data Structures," Jun. 13-17, 1994, IEEE Twenty-Fourth International Symposium on Fault-Tolerant Computing, FTCS-24, Digest of Papers, p. 164-173.*

Schacham, Nachum, et al., "An Algorithm for Optimal Multicast of Multimedia Streams," Jun. 12-16, 1994, IEEE 13th Proceedings on Networking for Global Communications, vol. 2, p. 856-864.*

* cited by examiner

*Primary Examiner*—Glenn A. Auve
*Assistant Examiner*—Donna K. Mason
(74) *Attorney, Agent, or Firm*—Charles A. Johnson; Mark T. Starr; Crawford Maunu PLLC (57) ABSTRACT

Coded requests are received from Memory Port Interfaces (608 and 612) and stored into Outgoing Queue (604). Coded requests are also received from Transaction Pipeline (610), some of which may be linked requests. In response to each linked request stored in Outgoing Queue (604), multiple bus requests are generated by Outgoing Queue (604) and assembled by Assembler (602) and placed onto Bus Interface (620).

13 Claims, 7 Drawing Sheets

METHOD AND APPARATUS FOR SPAWNING MULTIPLE REQUESTS FROM A SINGLE ENTRY OF A QUEUE

FIELD OF THE INVENTION

The present invention relates in general to an outgoing queue that stores pending bus requests, and more particularly, to linked bus requests capable of spawning multiple bus requests.

BACKGROUND OF THE INVENTION

Today's computing architectures are designed to provide the sophisticated computer user with increased Reliability, Availability, and Scalability (RAS). To that end, the rise of the Microsoft Windows NT/2000 operating environment has presented a relatively low cost solution to the traditional high-end computing environment. The introduction of the Enterprise Edition has extended the scalability and resilience of the NT Server to provide a powerful and attractive solution to today's largest and most mission critical applications.

The Cellular MultiProcessing (CMP) architecture is a software/hardware environment that is developing as the enabling architecture that allows the Windows NT/2000 based servers to perform in such mission critical solutions. The CMP architecture incorporates high performance Intel processors using special hardware and middleware components that build on standard interface components to expand the capabilities of the Microsoft Windows server operating systems. The CMP architecture utilizes a Symmetric MultiProcessor (SMP) design, which employs multiple processors supported by high throughput memory, Input/Output (IO) systems and supporting hardware elements to bring about the manageability and resilience required for enterprise class servers.

Key to the CMP architecture is its ability to provide multiple, independent partitions, each with their own physical resources and operating system. Partitioning requires the flexibility required to support various application environments with increased control and greater resilience. Multiple server applications can be integrated into a single platform with improved performance, superior integration and lower costs to manage.

The objectives of the CMP architecture are multifold and may consist at least of the following: 1.) to provide scaling of applications beyond what is normally possible when running Microsoft Windows server operating systems on an SMP system; 2.) to improve the performance, reliability and manageability of a multiple application node by consolidating them on a single, multi-partition system; 3.) to establish new levels of RAS for open servers in support of mission critical applications; and 4.) to provide new levels of interoperability between operating systems through advanced, shared memory techniques.

The concept of multiprocessors sharing the workload in a computer relies heavily on shared memory. True SMP requires each processor to have access to the same physical memory, generally through the same system bus. When all processors share a single image of the memory space, that memory is said to be coherent, where data retrieved by each processor from the same memory address is going to be the same. Coherence is threatened, however, by the widespread use of onboard, high speed cache memory. When a processor reads data from a system memory location, it stores that data in high speed cache. A successive read from the same system memory address results instead, in a read from the cache, in order to provide an improvement in access speed. Likewise, writes to the same system memory address results instead to writes to the cache, which ultimately leads to data incoherence. As each processor maintains its own copy of system level memory within its cache, subsequent data writes cause the memory in each cache to diverge.

A common method of solving the problem of memory coherence in SMP dedicated cache systems is through bus snooping. A processor monitors the address bus for memory addresses placed on it by other processors. If the memory address corresponds to an address whose contents were previously cached by any other processor, then the cache contents relating to that address are marked as a cache fault for all processors on the next read of that address, subsequently forcing a read of system memory. One major difficulty, however, in a multi-processor environment, is overloading the memory bus through the use of bus snooping, which results in a scalability limitation.

Another problem exhibited by SMP systems, is multiple processors often may request bus reads from the same cache line. Whether or not the cache reads result in a cache hit or miss, two separate responses are required to be generated for each bus read request received. This condition results in the production of redundant bus transactions within an outgoing bus request queue, thus needlessly occupying precious space within the queue for redundant transactions. A need exists, therefore, for a mechanism within the SMP system that links bus requests to the same cache line and then reduces the number of queued response requests by spawning multiple bus requests from the single linked request.

SUMMARY OF THE INVENTION

The present invention is directed to a method and apparatus for recognizing that a plurality of bus requests are related and are, therefore, combined into a single linked request. The single linked request occupies a smaller portion of memory within a request queue than would normally be required for each request stored individually. In addition, the single linked request is identified and subsequently parsed into multiple bus requests to be applied to the system bus.

In accordance with one embodiment of the invention, a single request to multiple request generation subsystem is provided. The subsystem comprises a plurality of request generation units coupled to provide requests, and a queue coupled to receive the requests. A portion of the requests are identified as linked requests, each linked request spawning multiple requests.

In accordance with another embodiment of the invention, a multiprocessing system is provided. The multiprocessing system comprises a plurality of multiprocessors sharing a common system bus with access to a common memory pool, and a node controller coupled to each of the plurality of multiprocessors. The node controller comprising a plurality of request generation units coupled to provide requests, and a queue coupled to receive the requests. A portion of the requests are identified as linked requests, each linked request spawning multiple requests.

In accordance with another embodiment of the invention, a method of spawning multiple requests from a single entry of a request queue is provided. The method comprises receiving a plurality of requests into the request queue, recognizing a request as a single entry linked request from the plurality of requests, and generating multiple bus requests in response to recognizing the single entry linked request.

In accordance with another embodiment of the invention, a method of increasing effective capacity of a request queue is provided. The method comprises a means for recognizing that a pair of requests are related, a means for combining the pair of requests into a single linked request, and a means for generating multiple requests from the single linked request. The single linked request occupies a smaller space within the request queue as compared to a space required for the pair of requests.

DETAILED DESCRIPTION

Figure 1:
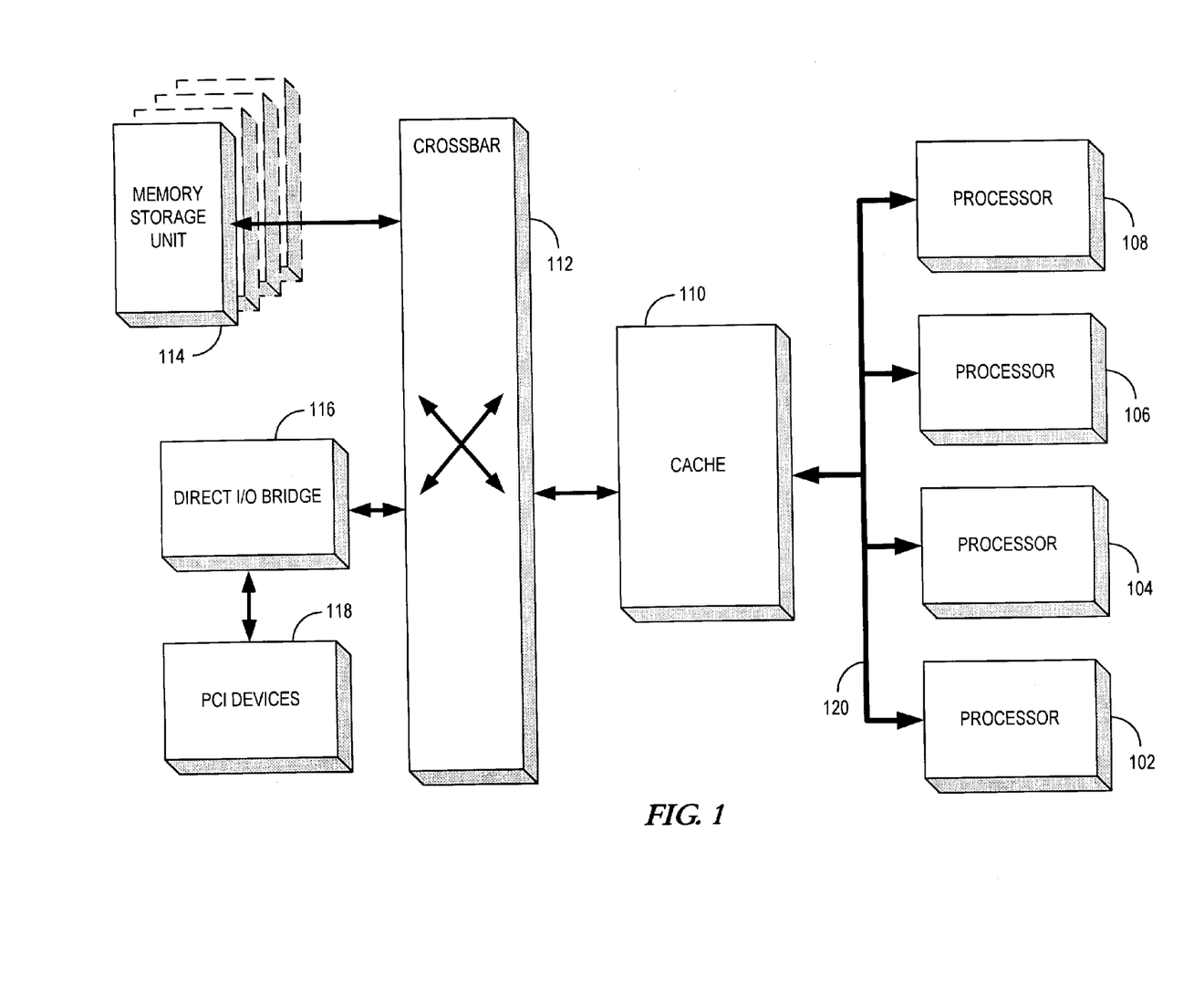
FIG. 1 illustrates a block diagram of a processing cell in accordance with the present invention.

FIG. 1 illustrates an exemplary block diagram of a processing cell in accordance with the present invention. A typical processing cell, or sub-pod, is comprised of multiple Central Processing Units 102–108 and a corresponding Cache 110. The processing units may be of the 128 bit McKinley processor family as produced by Intel Corp., the 64-bit, IA-64 Itanium family, also produced by Intel Corp., or may, for example, be of the 32-bit, Xeon processing family, also produced by Intel Corp. Each of processors 102–108 share Cache 110 through bus 120, where bus 120 may serve up to, for example, four Processors 102–108. Memory Storage Units 114 provides a shared memory pool for Processors 102–108 through non-blocking Crossbar 112. Direct IO Bridge 116 provides high-throughput access to Peripheral Component Interconnect devices 118. It should be noted that the present invention is not limited for use with only those processors listed above, but may be used with any processor that is compatible within a multi-processing environment.

Memory Storage Unit 114 may consist of up to four main memory banks each of which may contain a maximum of 16 GigaBytes of Random Access Memory. Likewise, Cache 110 may comprise up to four banks of cache (not shown), each cache bank may contain up to 32 MegaByte of RAM, which is on the order of five times faster than Memory Storage Unit 114 RAM. Each cache bank has a dedicated, direct connection to each of Memory Storage Units 114, each direct connection being supported by crossbar 112. Memory Storage Unit 114 has a typical mainframe design, such that each Memory Storage Unit 114 may handle hundreds of access requests concurrently. Even higher performance may be realized by allowing interleaving between each Memory Storage Unit 114. When interleaving is enabled, data may be spread across all Memory Storage Units 114 and may be accessed in parallel by any one of Processors 102–108 and/or Cache 110. Crossbar 112 allows for fast, consistently low latency, high bandwidth transmissions between Cache 110 and IO bridge 116.

Multiple sub-pods, like the sub-pod illustrated in FIG. 1, may be combined to provide a highly scalable solution for today's demanding enterprise environments in accordance with the present invention. A single configuration of multiple sub-pods, for example, may include a total of 32 processors, along with eight cache modules, 64 GB of main memory, four cross-bars and eight direct I/O bridges to support a total of 96 PCI slots.

Figure 2:
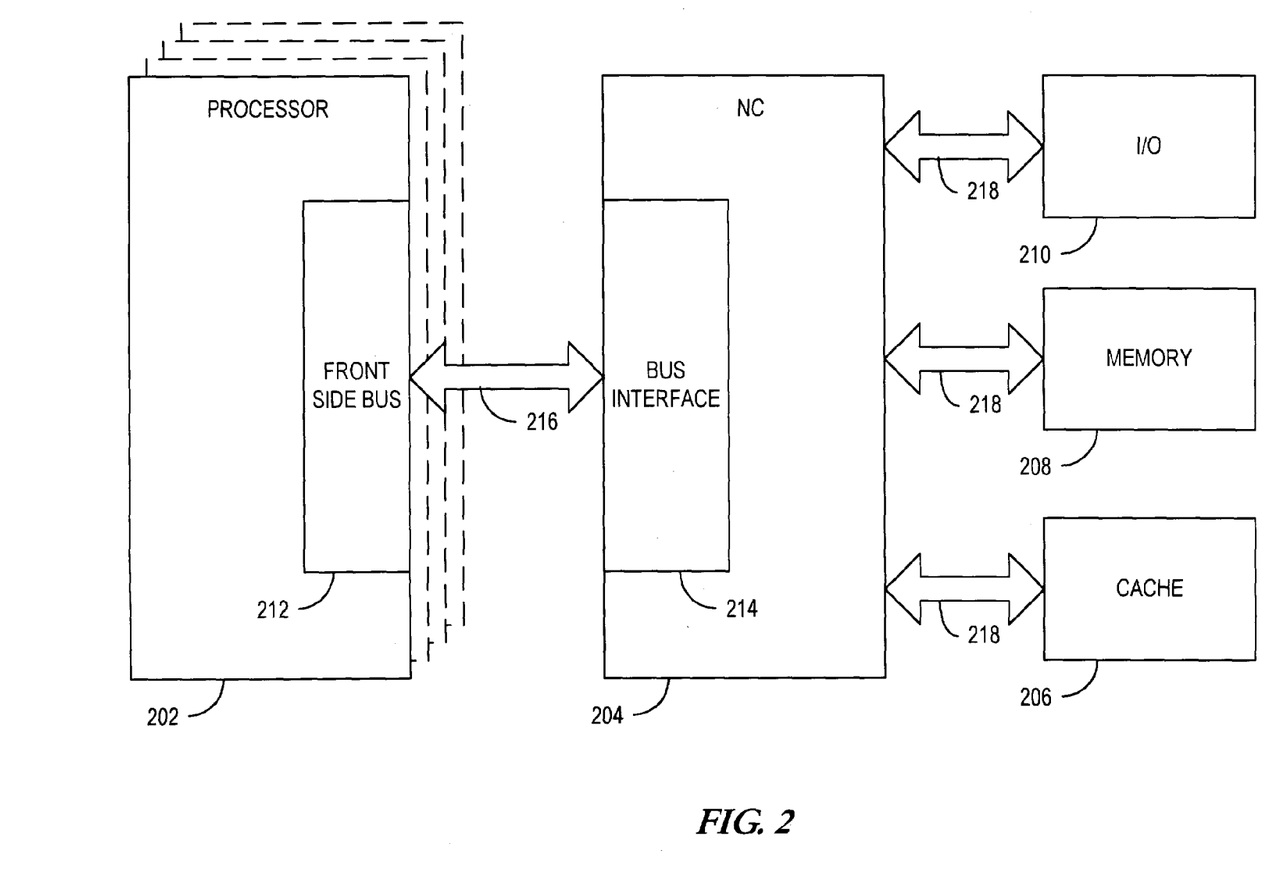
FIG. 2 illustrates a block diagram of the bus interaction of the processing cell of FIG. 1.

FIG. 2 illustrates an exemplary block diagram illustrating bus components within processors 202 and the associated bus controller required to negotiate bus access by Processors 202 to I/O 210, Memory 208, and Cache 206. Processors 202 each contain Front Side Bus 212. Node Controller 204 provides the processor system Bus Interface 214 and cache controller chip for up to four Processors 202 operating on common System Bus 216. Node Controller 204 resides on the sub-pod module and is the central agent on the processor system bus to allow interactions between Processors 202, Cache 206, MSU 208, and I/O 210.

Node Controller 204 facilitates access to Cache 206 providing quick access to commonly used cache lines that are requested on System Bus 216. The data portion of Cache 206 resides in Static RAM (SRAM) that is external to Node Controller 204 and a corresponding on-chip tag RAM keeps track of state and control information for the resident cache lines. In operation, copies of frequently accessed state and control information, called cache blocks or cache lines, are maintained in the SRAM portion of Cache 206. Each cache block or line is marked with a block address, referred to as a tag, so that Cache 206 knows to which part of the SRAM memory space the cache line belongs. The collection of cache tags for each memory block contained within the SRAM is contained within the on-chip tag RAM. For example, if cache line $B_j$ containing data entries $D_j$ is assigned to a portion of SRAM called $M_1$, then $B_j$ is in the on-chip tag RAM and $D_j$ is contained within the SRAM of Cache 206. Cache 206 is a non-inclusive cache, meaning that not all cache lines resident in the processor's cache are necessarily resident in Cache 206.

In operation, Node Controller 204 decodes Front Side Bus 212 transactions on System Bus 216 into two main types: 1.) coherent memory requests; and 2.) non-coherent requests. Coherent memory requests are controlled under the MESI protocol throughout the system and Cache 206. Memory within a multiprocessor system in which every memory read and every memory write is instantly known by each processor within the system is known as coherent memory. Coherent memory requests, therefore, must communicate the memory accessed by one processor to the other processors on the bus through the use of a bus snooping function, so that stale data is not used. Coherent memory requests on System Bus 216 are monitored by the bus snooping function and communicated to all Processors 202 on System Bus 216. The non-coherent requests, on the other hand, correspond to requests such as memory-mapped I/O, interrupts, and other special transactions which do not use Cache 206.

Communication between Node Controller 204, I/O 210, Memory 208 and Cache 206 is conducted via Interface 218, which is implemented using a crossbar similar to the crossbar discussed in relation to FIG. 1. The crossbar is a multi-input, multi-output, non-blocking electronic switch, where access from Node Controller 204 and external components is unimpeded, thus removing any potential bottlenecks. The number of Processors 202 operating in conjunction with Node Controller 204 is advantageously limited in order to avoid excessive bus contention on System Bus 216, especially in consideration of the bus snooping function as discussed above.

Data transfer on System Bus 216 may be implemented on varying width buses to include 32, 64 and 128 bit buses and beyond. The clocking rate on System Bus 216 is usually in the range of several hundred MegaHertz (MHz) and data may be transferred on both the rising and falling edges of the system bus clock to achieve an effective System Bus 216 bandwidth of several GigaHertz (GHz). Processors 202 are responsible for obeying any bus specification that may exist for System Bus 216 between Front Side Bus 212 and Bus Interface 214.

Bus Interface 214 interfaces Node Controller 204 to Front Side Bus 212 for each of Processors 202. Bus Interface 214 provides at least the following functions: 1.) a request queue that allows Node Controller 204 or Processors 202 to generate bus requests; 2.) an in-order queue to receive bus requests from processors 202; 3.) a snoop interface to provide address and function information necessary to snoop Node Controller 204 tag RAM and then to provide the tag status to the snoop interface; 4.) response cycle generation to complete bus operations; 5.) generation of deferred phase operations; and 6.) a data transfer interface to provide the control and necessary data queues to transfer data bus reads, writes, interrupts and special transactions.

Figure 3:
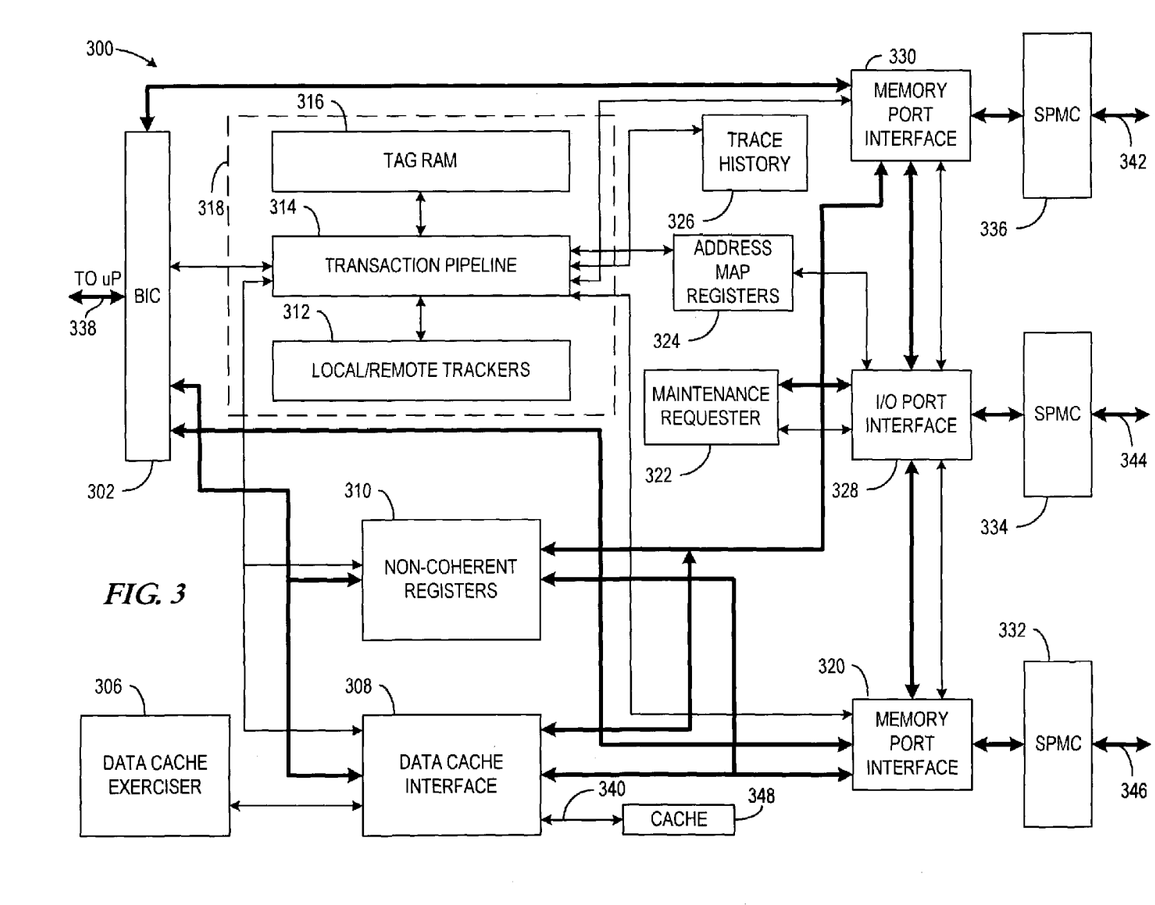
FIG. 3 illustrates a block diagram of a node controller in accordance with the present invention.

FIG. 3 illustrates an exemplary block diagram of Node Controller 300 in accordance with the principles of the present invention and is interconnected as follows. Bus Interface Controller 302 connects to System Bus 338, which is the system bus for the processors attached to the particular sub-pod of interest. Bus Interface Controller 302 interconnects through a data bus to Memory Port Interfaces 320 and 330 as well as to Data Cache Interface 308. Transaction Processor 318 is comprised of Tag RAM 316, Transaction Pipeline 314 and Local/Remote Trackers 312. Tag RAM 316, Transaction Pipeline 314 and Local/Remote Trackers 312 are each interconnected through a control bus and Transaction Pipeline 314 is interconnected to Bus Interface Controller 302 through a control bus. Transaction Pipeline 314 also provides control through a control bus to Address Map Registers 324, Trace History 326, Memory Port Interfaces 330 and 320. A data bus interconnects Bus Interface Controller 302 and Non-Coherent Registers 310 and Data Cache Interface 308. A data bus also interconnects Non-Coherent Registers 310 and Data Cache Interface 308 to Memory Port Interfaces 320 and 330. Data Cache Interface 308 is interconnected to Cache 348 that may be separately located, e.g. off-chip, from Data Cache Interface 308. Maintenance Requestor 322 and I/O Port Interface 328 are interconnected by both a data bus and a control bus. A control bus interconnects Address Map Registers 324 to I/O Port Interface 328. Data and control bus interfaces exist between I/O Port Interface 328 and Memory Port Interfaces 320 and 330. Scalability Port Memory Controllers 332, 334, and 336 interconnect through a data bus to Memory Port Interface 320, I/O Port Interface 328, and Memory Port Interface 330, respectively. Data Buses 342 and 346 interconnect Scalability Port Memory Controllers 336 and 332, respectively, to the respective Memory Storage Unit associated with the particular sub-pod assembly. It should be noted that dual Data Buses 342 and 346 are provided to Node Controller 204 to allow for fault tolerant functionality, parallel processing, etc. Scalability Port Memory Controllers 344 transfer data between I/O Port Interface 328 and PCI devices 118 as depicted in FIG. 1 and I/O Devices 210 as depicted in FIG. 2.

In operation, Node Controller 300 provides all the necessary functions required to facilitate processor bus operations on System Bus Interface 338. In particular, Node Controller 300 facilitates at least seven primary functions: 1.) Out-Going Queue for outgoing requests to be sent out to Bus Interface Controller 302; 2.) In-Order Queue for incoming requests from Bus Interface Controller 302; 3.) Response Control for all bus requests; 4.) Datapath for data transfer and control between Memory Storage Units; 5.) I/O interface module to facilitate access to PCI devices; 6.) History Stack for Bus Interface Controller 302 history capture; and 7.) Error Checking to collect and check all errors. The other major interfaces accommodated by Node Controller 300 include the Bus Interface Controller 302 to Transaction Pipeline 314 interface which handles control signals and address/function signals, data transfers between Bus Interface Controller 302 and Data Cache Interface 308, data transfers between Bus Interface Controller 302 and Memory Storage Unit 0 (not shown) on Interface 342, data transfers between Bus Interface Controller 302 and Memory Storage Unit 1 on Interface 346 and non-coherent data transfers between Bus Interface Controller 302 and Non-Coherent Registers 310.

The Out-Going Queue function receives requests to be sent to Bus Interface Controller 302 from either Transaction Pipeline 314, Memory Port Interface 330, or Memory Port Interface 320. The requests are individually strobed into a priority selection block which acknowledges and grants execution of the request according to a prioritized selection algorithm, or held for later processing within the Out-Going Request Queue. Each of the requesting entities places information concerning the request type, which may be represented by a 3–5 bit digital code identifying one of a number of possible request types. Likewise, an In-Order Queue is utilized to store requests received from the processor on Bus Interface Controller 302 pertaining to, for example, snoop requests or write transactions sent from the processor.

The request signals comprise, for example, an active low address field used to identify the recipient of the request as well as a parity field to maintain an even number of active low signals on the address bus. Likewise, the request field is maintained with even parity by an associated request parity bit. The lower three bits of the address field are mapped into byte enable signals, which allows for a programmable number of bytes to be transferred in a given transaction. The programmable number of bytes for transfer in a single clock transition is, for example, 0 to 8 bytes.

Response signals are generated in response to the requests received and provide status for the requests that have been received. Each response signal comprises a response status field, whose parity is held even by a response parity field. Additionally, a Target Ready bit is maintained within the response signal to allow the receiving party to signal its readiness for write data or writeback data, if a data write is appropriate for the particular request. For transactions with an implicit writeback, the Target Ready bit is asserted twice, first for the write data transfer and second for the implicit writeback data transfer.

Data response signals control the transfers of data on Bus Interface 338. The agent responsible for transferring data on the data bus is responsible for indicating that data on the bus is valid and that the data should be latched. The data bus agent, for example, should assert a ready bit at both the rising edge and falling edge of the bus clock for double-pumped operation. Additionally, the ready bit may be deasserted by the transmitting entity in order to insert wait states into the data phase. Bus Interface 338 may represent, for example, a 32, 64, or 128 bit width and may be enabled for individual bytes within Bus Interface 338. For example, if Bus Interface 338 is 64 bits wide, then the bus is capable of transferring 8 bytes of data at a time, where each byte equals 8 bits. A 3-bit byte enable field, for example, could then be used to provide information as to which bytes of data are valid on the 64-bit bus. Additionally, the data transferred on Bus Interface 338 may be Error Correction Coded regardless of which bytes are enabled.

Figure 4:
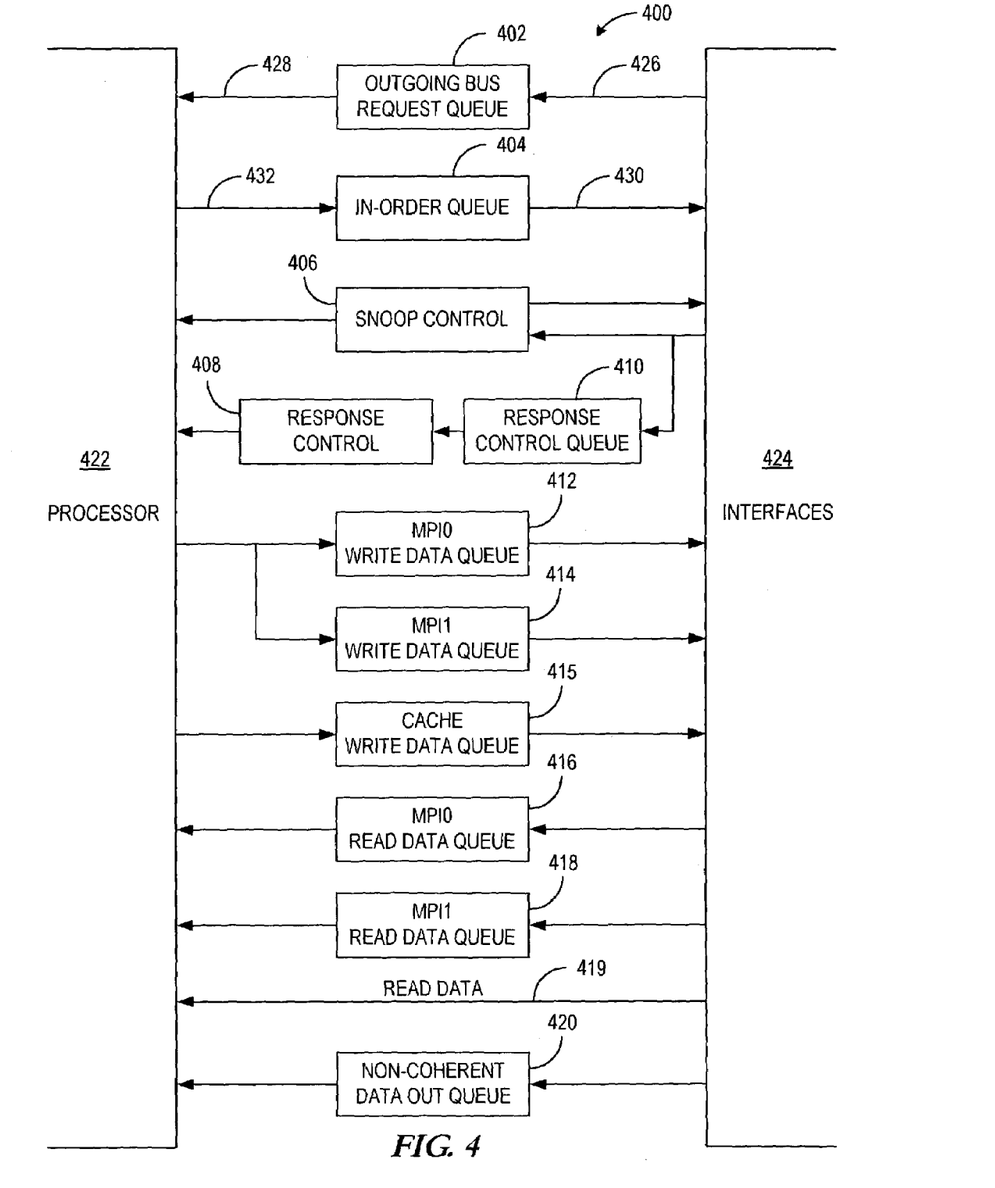
FIG. 4 illustrates a functional block diagram of the bus interface controller of FIG. 3.

FIG. 4 illustrates an exemplary functional block diagram 400 of Bus Interface Controller 302 as illustrated in FIG. 3. Processor 422 may represent one of many processors adapted to contemporaneously interface with other modules/interfaces 424 of the system, such as to the memory interface, cache interface, pipeline, etc. Generally speaking, there exist five phases of operation of Bus Interface Controller 302: 1.) Arbitration; 2.) Request; 3.) Snoop; 4.) Response; and 5.) Data. Arbitration phase operation of Bus Interface Controller 302 allows for one of Processors 422 to obtain control of Bus Interface 338, or alternatively to allow other Interfaces 424 to obtain control of Bus Interface 338, during one or more bus clock cycles. Arbitration phase is entered when one of Processors 422 asserts a bus request signal or another interface 424 asserts the bus request signal. A number of agents may simultaneously arbitrate for the request bus, where Processors 422 represent symmetric agents and the other interfaces 424 represent priority agents. Owning the bus is a necessary precondition for initiating a transaction. The symmetric agents arbitrate for the bus based on a round-robin rotating priority scheme. Priority agent bus requests override symmetric agent bus requests, where the priority agent bus request is always the next bus owner. The response to the bus request signal is assertion of a bus priority signal to the requesting device having priority, thereby relinquishing control of the bus to either the symmetric agents or the priority agent. Bus blocking control may be asserted by any of the bus agents to block further transactions from being issued to the request bus, in such instances, for example, when system resources, such as address and data buffers, are about to become temporarily busy or filled and cannot accommodate another transaction.

The request phase of Bus Interface Controller 302 is entered when either Processors 422 or Interface 424 modules have successfully arbitrated for bus control. With reference to both FIGS. 3 and 4, request signals may be provided by Transaction Pipeline 314, Memory Port Interface 330, and Memory Port interface 320 via Interfaces 424, and bus request signals may be provided by Processor 422 in order to generate snoop requests. Assertion of an address strobe signal defines the beginning of the request transaction. An active low address is provided along with the address strobe signal as part of the request. The low three bits are mapped into byte enable signals to accommodate, for example, 0 through 8 byte transfers per clock cycle. Even parity is used to insure that an even number of active low signals exist throughout the entire request signal.

Outgoing Bus Request Queue 402 receives bus requests from one or more modules/interfaces 424 via interface 426 and provides the requests via Interface 428 to the addressed Processor 422 of the request. Likewise, In-Order Queue 404 receives bus requests from Processor 422 via Interface 432 and provides the bus requests to the addressed recipient via Bus 430. Each of Outgoing Bus Request Queue and In-Order Queue is limited, for example, to a depth of 8 and are responsible for queuing up requests from Interfaces 424 and Processor 422, respectively. Handshake signals are used between Outgoing Bus Request Queue 402 and modules/interfaces 424 and also between In-Order Queue 404 and Processor 422 in order to throttle the number of requests received by each of Queues 402 and 404. Additional signaling is provided by Outgoing Bus Request Queue 402 when the queue has been filled to a predetermined depth. If, for example, the predetermined depth is 5 and the overall queue depth is 8, then 3 extra slots are provided in Outgoing Bus Request Queue 402 to allow for potential requests that may be waiting in Transaction Pipeline of FIG. 3. Each of Processors 422 monitors the In-Order Queue 404 and will stop sending requests when the queue is full.

Snoop phase operation is controlled through the combined operation of In-Order Queue 404 and Snoop Control 406 and is required to maintain cache coherency. With regard to FIGS. 2 and 3, Memory Port Interfaces 330 and 320 provide write and read access to, for example, Memory 208. Memory reads are cached into Cache 348 by Data Cache Interface 308, whereby subsequent access to the same memory space results in a memory read from Cache 348 instead of a memory read from Memory 208, resulting in a shorter memory access time. Memory 208, however, represents shared memory space to each Processor 422. Data read from Memory 208 and subsequently cached during one clock cycle from a first Processor 422 may be invalidated by a subsequent write to the same address in Memory 208 by a second Processor 422.

Snoop Control 406 is, therefore, used to provide snoop control of Cache 348 to Processors 422, while In-Order Queue 404 receives snoop requests from Processors 422. In operation, snoop signals from Snoop Control 406 allow Processors 422 to determine whether: 1.) an unmodified, requested cache line exists within Cache 348, resulting in a cache hit; 2.) a modified, requested cache line exists within Cache 348, resulting in a cache hit to a modified cache line; or 3.) no cache line exists within Cache 348, resulting in a cache miss. The snoop signals from Snoop Control 406 are used to maintain cache coherency at the system level and, therefore, provide an indication that the on-chip cache line within the snooping agent, e.g., Processor 422, is valid or invalid, whether the Cache 348 line is in a modified, or dirty, state or whether the transaction should be extended until such time that a valid snooping state may be determined.

The response phase of Bus Interface Controller 302 is controlled by Response Control Queue 410 and Response Control 408 and are responsive to requests received by In-Order Queue 404. A responding agent within the modules/interfaces 424 is responsible for processing requests at the top of In-Order Queue 404, where the responding agent is the agent being addressed by the request, e.g., Memory Port Interface 330 during a memory read of Memory 208 of FIG. 2 or alternately a memory read of Cache 348, if cached memory is present. Each response contains a response identifier, which is used to provide a response code to be placed on Bus Interface 338 during the response phase of Bus Interface Controller 302. The response code identifies, for example, a result of a bus snoop initiated by one of Processors 422. The results of the bus snoop may indicate, for example, that normal data was found, that no data was found, that the request is to be deferred, or that the request is to be retried. It should be noted that if the response code indicates that either a retry or deferral is necessary and that Snoop Control 406 indicates that Cache 348 is in a modified state, then the retry or defer response code will be implicitly changed to an automatic writeback from Memory 208 of FIG. 2, where Cache 348 will provide itself as a target to maintain data coherency between Cache 348 and Memory 208.

The data phase of Bus Interface Controller 302 operates to transfer data between Memory Port Interface 320 and related Memory Port Interface 0 Write Data Queue 412 and Memory Port Interface 0 Read Data Queue 416 and between Memory Port Interface 330 and related Memory Port Interface 1 Write Data Queue 414 and Memory Port Interface 1 Read Data Queue 418. Cache data may also be transferred from the Processor 422 to cache via the Cache Write Data Queue 415, and to the Processor as shown on path 419. Non-coherent Data Out Queue 420 operates to transfer data contained from local registers within interfaces 424 to Processors 422. A byte enable field may be used to enable multiple data bytes on the data bus per transfer cycle.

An important feature of the present invention is the operation of Outgoing Bus Request Queue 402 as functionally illustrated in FIG. 4. Outgoing Bus Request Queue 402 receives coded requests from Memory Port Interface 330, Memory Port Interface 320, and Transaction Pipeline 314, all of FIG. 3, to be eventually placed onto Bus Interface 338 of FIG. 3. Additionally, Outgoing Bus Request Queue 402 assembles the coded requests into complete request signals to be placed onto Bus Interface 338 during the request phase of Bus Interface 338 of FIG. 3. Depending upon the request code received from Memory Port Interface 330, Memory Port Interface 320, or Transaction Pipeline 314 of FIG. 3, Outgoing Bus Request Queue 402 of FIG. 4 may generate and link multiple request signals from the single coded request.

One embodiment of Outgoing Bus Request Queue 402 of FIG. 4 may, for example, provide a depth capable of storing up to 8 coded requests entries, or 16 coded request entries if the coded requests are to be linked to each other. The capacity, or effective depth of Outgoing Bus Request Queue 402 of FIG. 4, for example, may be doubled if every request contained within Outgoing Bus Request Queue 402 of FIG. 4 is a linked request. Linked requests are those requests that relate to each other and, therefore, may be linked, or combined, to achieve efficiency within Outgoing Bus Request Queue 402 of FIG. 4. The coded requests received from Memory Port Interface 330 and Memory Port Interface 320 may, for example, include port invalidate line, port read invalidate line, bus read invalidate line, and bus invalidate line requests, to name only a few. Once the Outgoing Bus Request Queue 402 receives the coded requests, it may create multiple bus requests to be placed onto Bus Interface 338 as necessary in response to the received coded requests.

Coded requests from Transaction Pipeline 314 of FIG. 3 may include, for example, deferred replies, non-coherent memory requests, and linked requests. Linked requests from Transaction Pipeline 314 of FIG. 3 represent a single entry within Outgoing Bus Request Queue 402 of FIG. 4, but result in multiple bus requests being placed onto Bus Interface 338 of FIG. 3. Logic internal to Outgoing Bus Request Queue 402 of FIG. 4 recognizes the linked requests from Transaction Pipeline 314 of FIG. 3 as being in a linked format and generates any required number of bus requests as necessary to fulfill the linked request from Transaction Pipeline 314 of FIG. 3.

Figure 5:
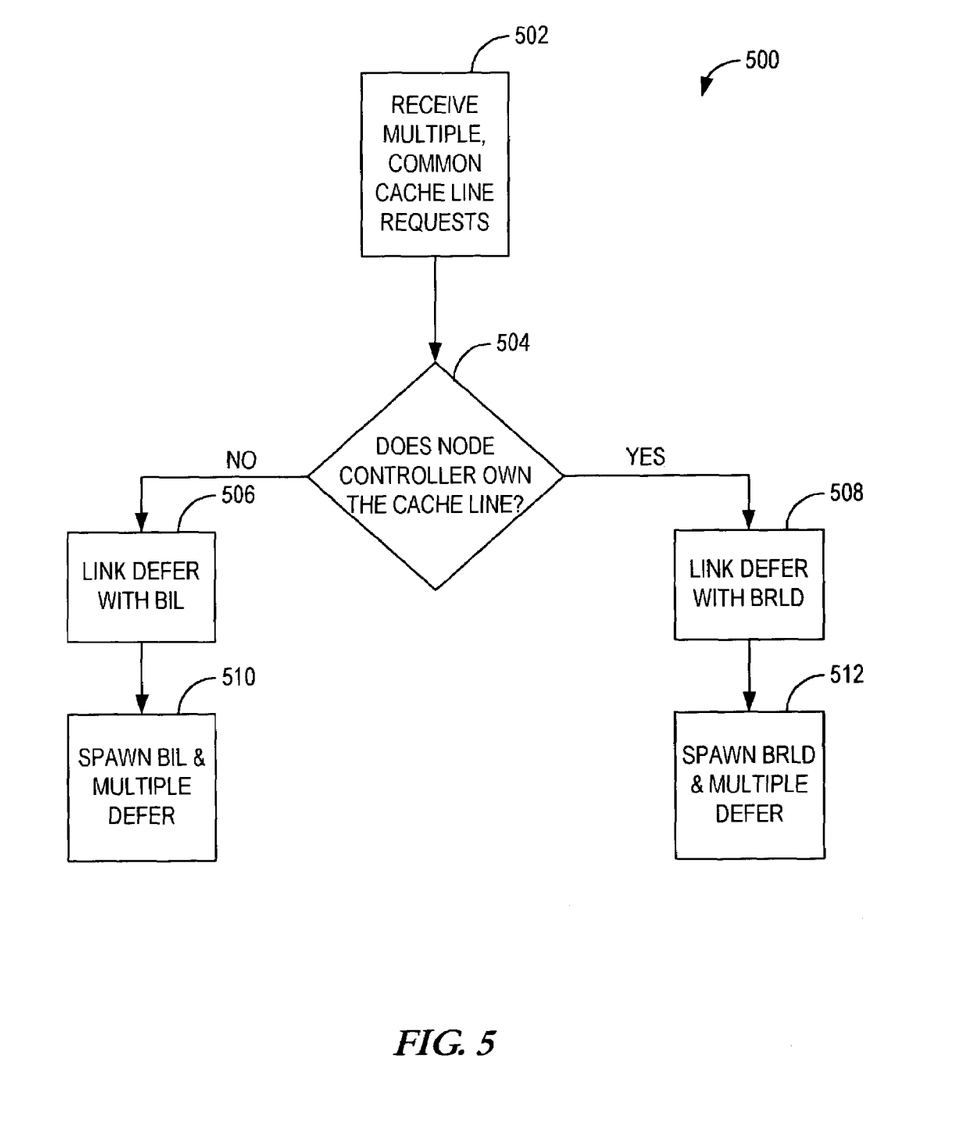
FIG. 5 illustrates an exemplary flow diagram for the generation of linked bus requests.

FIG. 5 represents an exemplary flow chart illustrating one example of bus activity that leads to a linked request operation from Outgoing Bus Request Queue 402 of FIG. 4. Step 502 represents a situation where multiple cache line requests are presented that refer to the same cache line. The cache requests may be presented on Bus Interface 338 of FIG. 3 by any one of Processors 202 of FIG. 2 during the snoop phase of bus interface 338 of FIG. 3 and may represent, for example, Bus Read Line (BRL) requests.

Transaction Pipeline 314 of FIG. 3 receives the bus read line requests and performs a tag lookup into Tag RAM 316 of FIG. 3 in order to determine whether or not the cache line requested by Processors 202 of FIG. 3 is owned by Node Controller 300 of FIG. 3. That is to say that if the cache line requested by Processors 202 of FIG. 2 is contained within Cache 348 of FIG. 3, then a tag representative of that cache line will be contained within Tag RAM 316 of FIG. 3. Once the Tag is located within Tag RAM 316 of FIG. 3, a cache hit is generated by Transaction Pipeline 314 of FIG. 3 and then Bus Interface Controller 302 of FIG. 3 provides snoop, response and data in response to the cache hit.

Step 502 may, however, result in a cache miss when the cache tag lookup performed by Transaction Pipeline 314 of FIG. 3 into Tag RAM 316 of FIG. 3 results in a determination that Node Controller 300 of FIG. 3 is not the owner of the cache line in step 504 and processing takes the NO path to process step 506. In such a case, the data requested by processors 202 of FIG. 2 is necessarily retrieved from Memory 208 of FIG. 2, since no data existing within Cache 206 matches the data requested by Processors 202 of FIG. 2. In this instance, while the data is being retrieved from Memory 208 of FIG. 2, a DEFER signal without a cache hit miss is placed onto Bus Interface 338 of FIG. 3 by Transaction Pipeline 314 via Bus Interface Controller 302. The DEFER signal without a cache hit miss from Transaction Pipeline 314 indicates that Node Controller 300, acting as a deferring agent, has taken ownership of the cache line requested by Processor 202 of FIG. 2. All subsequent attempts to the cache line must be either retried or deferred, so long as the deferring agent has not completed the deferred request.

Step 506 represents the reply processing, for example, by Outgoing Queue 604 in conjunction with Transaction Pipeline 314, when a linked request is required. Since a cache miss caused the DEFER signal to be placed onto Bus Interface 338 for each of the bus read line requests sent by Processors 202 of FIG. 2, Processors 202 are waiting for a DEFER response request from Transaction Pipeline 314 of FIG. 3. Transaction Pipeline 314 of FIG. 3 issues linked request, BIL/DEFER, to Outgoing Queue 604 of FIG. 6. Outgoing Queue 604 of FIG. 6 recognizes the request as a linked request and first issues a Bus Invalidate Line (BIL) bus request on Bus Interface 620 in order to invalidate all outstanding cache lines as in step 510. Additionally, Outgoing Queue 604 places a number of DEFER response requests on Bus Interface 620 of FIG. 6 equal to the number of requesting processors 202 of FIG. 2.

Alternately, step 502 may result in a cache hit at step 504 when the cache tag lookup performed by Transaction Pipeline 314 of FIG. 3 into Tag RAM 316 of FIG. 3 results in a determination that Node Controller 300 of FIG. 3 is the cache line owner and processing takes the YES path to process step 508. In such a case, the data requested by Processors 202 of FIG. 2 is retrieved from Cache 206 of FIG. 2. In this instance, while the data is being retrieved from Cache 206 of FIG. 2, a DEFER signal is placed onto bus interface 338 of FIG. 3 by Transaction Pipeline 314 via Bus Interface Controller 302. The DEFER signal from Transaction Pipeline 314 indicates that Node Controller 300, acting as a deferring agent, has taken ownership of the cache line requested by Processor 202 of FIG. 2. All subsequent attempts to the cache line must be either retried or deferred, so long as the deferring agent has not completed the deferred request.

Step 508 represents the reply processing, for example, by Outgoing Queue 604 in conjunction with Transaction Pipeline 314, when a linked request is required. Since a cache hit caused the DEFER signal to be placed onto Bus Interface 338 for each of the bus read line requests sent by Processors 202 of FIG. 2, Processors 202 are waiting for a DEFER response request from Transaction Pipeline 314 of FIG. 3. Transaction Pipeline 314 of FIG. 3 issues linked request, BRLD/DEFER, to Outgoing Queue 604 of FIG. 6. Outgoing Queue 604 of FIG. 6 recognizes the request as a linked request and first issues a Bus Read Line Data (BRLD) bus request on Bus Interface 620 in order to invalidate all outstanding cache lines as in step 512. Additionally, Outgoing Queue 604 places a number of DEFER response requests on Bus Interface 620 of FIG. 6 equal to the number of requesting processors 202 of FIG. 2.

Local/Remote Trackers 312 of FIG. 3 are responsible for tracking all DEFER signals owned by Node Controller 300 of FIG. 3, through the use of a Local Access Transaction Tracker (LATT). Additionally, when 2 or more deferred transactions owned by Node Controller 300 of FIG. 3 pertain to the same cache line and bus operation, then the transactions are linked together into a single request at step 506 and 508. Transaction Pipeline 314 of FIG. 3 provides the single, linked request to Outgoing Bus Request Queue 402. After receiving the single, linked request, Outgoing Bus Request Queue 402 recognizes the linked request as such and generates multiple requests in step 510 and 512 on Bus Interface 338 in response thereto. The first request generated on Bus Interface 338 of FIG. 3 in response to the linked request is, for example, a Bus Invalidate Line request, which serves to invalidate any outstanding cache lines that may be owned by any other agent on Bus Interface 338 of FIG. 3. The next two requests generated by Outgoing Bus Request Queue 402 are, for example, Deferred Replies for the first and second Bus Read Data requests sent by Processors 202 of FIG. 2.

Figure 6:
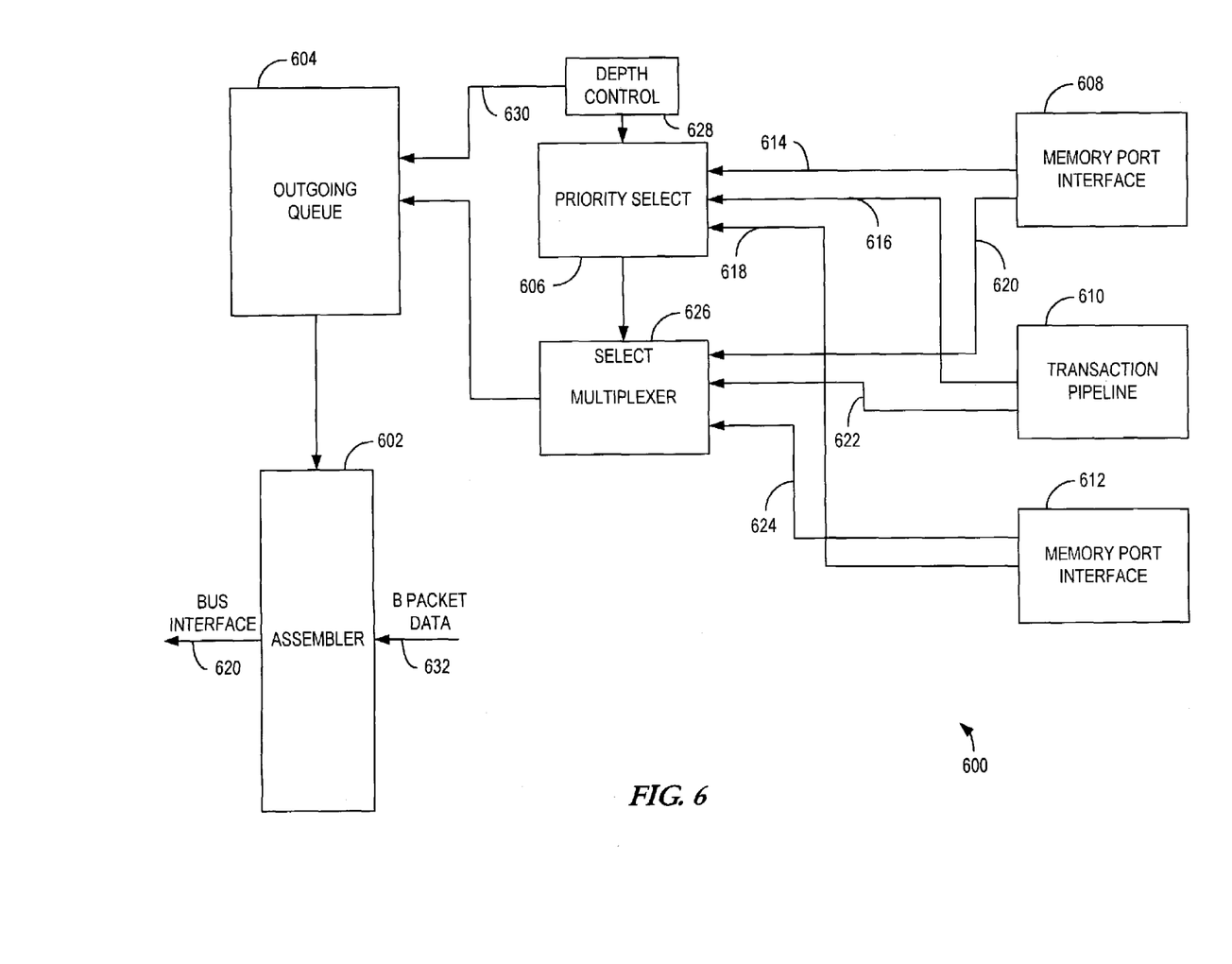
FIG. 6 illustrates an exemplary outgoing request subsystem in accordance with the present invention.

FIG. 6 illustrates an exemplary block diagram of an outgoing bus request generator according to the present invention. Memory Port Interface 608 and 612 are connected to Priority Select 606 via bus request strobe lines 614 and 618, respectively, and Transaction Pipeline 610 is connected to Priority Select via bus request strobe line 616. Priority Select 606 selects one bus request strobe 614, 616, or 618 that has priority in the event that multiple requests are simultaneously received from Memory Port Interface 608, 612 and Transaction Pipeline 610. Transaction Pipeline 610 is given priority over both Memory Port Interface 608 and 612 in the event of a tie. Priority between Memory Port Interface 608 and 612 is alternated through a round-robin technique. Priority Select 606 provides the Select signal required by Multiplexer 626 to select between lines 620, 622, or 624. Signals 620, 624, and 622 carry the coded bus requests from Memory Port Interface 608, 612 and Transaction Pipeline 610, respectively, to Multiplexer 626. The bus requests received by Outgoing Queue 604 are the coded bus requests from Memory Port Interface 608, Transaction Pipeline 610, and Memory Port Interface 612 that have been selected by Multiplexer 626 according to the priority calculated by Priority Select 606. Outgoing Queue 604 then receives the coded requests from Multiplexer 626 and produces multiple requests in response to the coded requests and provides them to Assembler 602. Assembler 602 receives the multiple requests from Outgoing Queue 604 and assembles the multiple requests with B packet data 632 prior to presentation as bus requests on Bus Interface 620.

Outgoing Queue 604 is, for example, an 8 request deep queue. Pointers 630 are used by Depth Control 628 to provide tracking capability within Outgoing Queue 604, so that new coded requests incoming from Multiplexer 626 do not overwrite pending coded requests within Outgoing Queue 604. Depth Control 628 provides Priority Select 606 with a depth control signal that is used by Priority Select 606 to throttle down the number of coded requests received by Memory Port Interface 608 and 612 and Transaction Pipeline 610.

Figure 7A:
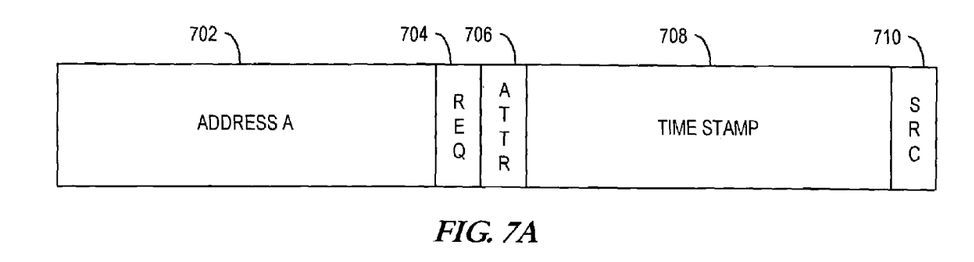
FIGS. 7a–7c illustrates exemplary formats of coded requests.
Figure 7B:
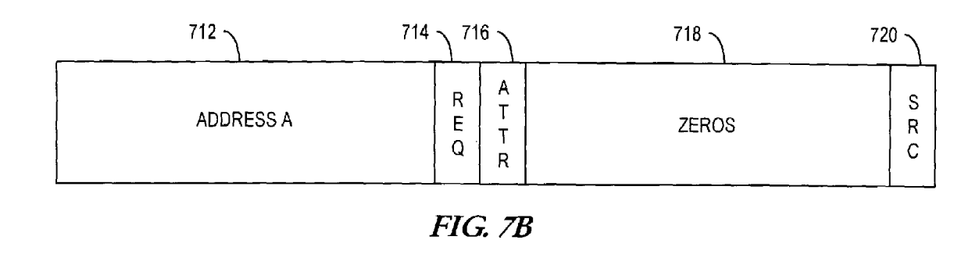
Figure 7C:
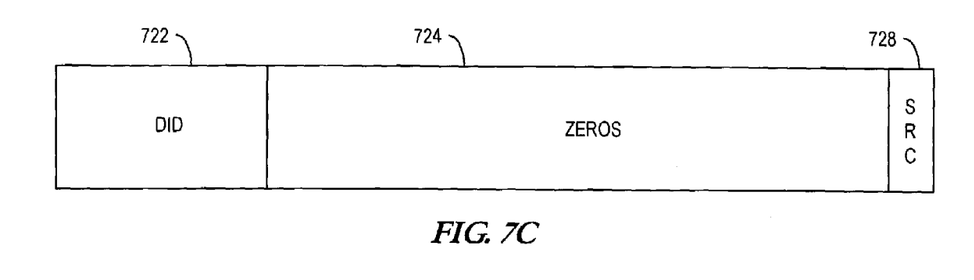

FIGS. 7a–7c provide exemplary formats for the coded request signals that may be provided by Memory Port Interfaces 608 and 612 and Transaction Pipeline 610. FIG. 7a, for example, provides the coded format for a request from Memory Port Interface 608 or 612 of FIG. 6. FIG. 7b, for example, provides the coded format of a request from Transaction Pipeline 610 of FIG. 6 and FIG. 7c, for example, provides the coded format for a defer request from Transaction Pipeline 610 of FIG. 6. Address A 702 and 712 is the address A packet that determines the request recipient. REQ 704 and 714 provides the request type codes associated with the outgoing request as defined in Table 1.

The request type codes listed in Table 1 are an exemplary set of request codes that may be issued by Transaction Pipeline 610 and Memory Port Interfaces 608 and 612. Transaction Pipeline 610 generally provides the DEFER and INT signals, where DEFER is a response signal provided from Transaction Pipeline 610 when a processor is waiting for data from either of Memory 208 or Cache 206 of FIG. 2. Bus Invalidate Line (BIL) and Bus Read Line Data (BRLD) are signals provided by Memory Port Interfaces 608 and 612, where BIL is a coded request signal signifying that data is not present within Cache 206 of FIG. 2 and a data read from Memory 208 is required, thus invalidating all outstanding copies of cache lines held by Processors 202 of FIG. 2. BRLD, on the other hand, signifies a cache hit from Cache 206 of FIG. 2 and data from Cache 206 is to be provided on Bus Interface 620 of FIG. 6. The two linked request formats, BIL/DEFER and BRLD/DEFER represent an important feature of the present invention, in that storage of a single linked request in Outgoing Queue 604 allows multiple bus requests to be generated onto Bus Interface 620 by Assembler 602.

TABLE 1

| REQUEST CODE | Description |
| --- | --- |
| BIL | Bus Invalidate Line |
| BIL/DEFER | Linked BIL/DEFER request |
| BRLD | Bus Read Line Data |
| BRLD/DEFER | Linked BRLD/DEFER request |
| BRC | Bus Read Current |
| PurgeTC | Purge Global Translation Cache |
| DEFER | Defer Request |
| INT | Interrupt |

Time Stamp 708 is a field provided by Memory Port Interfaces 608 and 612 to indicate the time of the request and any system information that may be necessary. SRC 710, 720, and 728 indicates the source of the coded request, whether it be from Memory Port Interfaces 608, Memory Port Interface 612, or from Transaction Pipeline 610 of FIG. 6. DID 722 of FIG. 7c provides the Defer Identification value in the deferred reply request from Transaction Pipeline 610 to Outgoing Queue 604 of FIG. 6. Only the DID is required because the DID is the only relevant information that is needed for a deferred reply.

An important feature of the present invention relates to the coded request messages DEFER, BIL and BRLD as listed in Table 1. DEFER, as discussed above, is an independent request provided by Transaction Pipeline 610 of FIG. 6, when, for example, a Bus Read Line request is placed on Bus Interface 338 of FIG. 3 by one of Processors 202 of FIG. 2. Similarly, if two Bus Read Line requests are generated for the same cache line, then Transaction Pipeline 610 of FIG. 6 places two DEFER requests on Bus Interface 338 of FIG. 3. Transaction Pipeline 610 of FIG. 6, however, only issues a single Tag lookup request to Tag RAM 316 of FIG. 3 because issuing two Tag lookup requests is redundant. If a cache miss results from the Tag lookup, then Transaction Pipeline 610, recognizing that the cache miss is to be reported twice, issues a linked request for the cache line having a BIL/DEFER code associated with the linked request. If, on the other hand, a cache hit results from the Tag lookup, then Transaction Pipeline 610, again recognizing that the cache hit is to be reported twice, issues a linked request for the cache line having a BRLD/DEFER code associated with the linked request.

Outgoing Queue 604 of FIG. 6, for both the BIL/DEFER and the BRLD/DEFER linked requests, recognizes the requests as being linked and generates multiple requests to Assembler 602, where Assembler 602 generates bus requests on Bus Interface 620 of FIG. 6 for each request received from Outgoing Queue 604. In both cases, therefore, Outgoing Queue 604 of FIG. 6 passes the multiple requests to Assembler 602 of FIG. 6 for final bus request assembly. For example, if a BIL/DEFER linked request is received from Transaction Pipeline 314, then Outgoing Queue recognizes the request code as a linked BIL/DEFER request and parses the linked request into two separate requests, BIL and DEFER, to Assembler 602. Assembler 602 then generates a bus request for both the BIL and DEFER requests by combining the request information from Outgoing Queue with B Packet Data 632 to formulate complete BIL and DEFER requests to be placed onto Bus Interface 620. B Packet Data 632 is data that is primarily static data and is dependent only upon the request type being placed onto Bus Interface 620 of FIG. 6. For example, B Packet Data defines the number of bytes within the full data width of the Bus Interface 620 of FIG. 6 that are active, or conversely, defines the total byte count for a particular bus transaction. Once the complete BIL request is assembled, it is placed onto Bus Interface 620 as a BIL bus request and followed by first and second DEFER response requests that pertain to the two BRL requests received from Processors 202 of FIG. 2 for the same cache line. Similarly, if a BRLD/DEFER linked request is received from Outgoing Queue 604, then a complete BRLD request is assembled and placed onto Bus Interface 620, followed by first and second DEFER response requests that pertain to the two BRL requests received from Processors 202 of FIG. 2 for the same cache line.

In conclusion, a method and apparatus has been presented that detects the presence of memory/cache requests that pertain to the same memory/cache line. Once detected, linked request responses are generated such that a single linked request may spawn multiple system bus requests, thus allowing for a reduction in size of the outgoing queue that stores the linked requests.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A multiprocessing system, comprising:
   a bus;
   a plurality of multiprocessors coupled to the bus with access to a common memory pool and adapted to provide cache line requests; and
   a cache memory arrangement;
   a control circuit coupled to the bus and to the cache memory arrangement, the control circuit adapted to determine whether a cache line referenced by a cache line request is present in the cache memory arrangement, generate an invalidate request in response to a cache line in a cache line request being absent from the cache memory arrangement, generate a defer request responsive to each cache line request, wherein a defer request indicates that the control circuit owns the cache line referenced by a cache line request, and combine each defer request and invalidate request that reference a common cache line into a single output request;
   a queue coupled to the control circuit and adapted to store each output request from the control circuit in a single queue entry; and; and
   a queue control circuit coupled to the queue and to the bus, the queue control circuit adapted to output to the bus at least one bus request for each queue entry, and in response to an output request in the queue being a combination of a defer request and an invalidate request, output to the bus an invalidate bus request and a respective defer bus request to each of the plurality of request generation units that provided a cache line request with the common cache line.

2. The multiprocessing system according to claim 1, wherein the queue control circuit includes an assembler coupled to receive the multiple requests and coupled to provide bus requests, wherein each bus request provided is comprised partially of a corresponding queue entry.

3. The multiprocessing system according to claim 1, further comprising:
   a priority selection block coupled to the control circuit for selection of the defer and invalidation requests and requests from a memory interface; and
   a depth controller coupled to the priority selection block and the queue to provide flow control of requests into the queue.

4. The multiprocessing system according to claim 3, wherein the priority selection block gives highest priority to one of requests from a plurality of memory interfaces and requests from the control circuit.

5. The multiprocessing system according to claim 4, wherein the highest priority is provided to the control circuit.

6. The multiprocessing system according to claim 4, wherein the priority selection block gives equal priority to the plurality of memory interfaces according to a round robin algorithm.

7. A method of spawning multiple requests from a single entry of a request queue, comprising:
   determining whether a cache line referenced by a cache line request is present in the cache memory arrangement;
   generating an invalidate request in response to a cache line in a cache line request being absent from the cache memory arrangement;
   generating a defer request responsive to each cache line request, wherein a defer request indicates that the control circuit owns the cache line referenced by a cache line request;
   combining each defer request and invalidate request that reference a common cache line into a single request;
   receiving a plurality of requests into the request queue, and storing each request in a single queue entry;

recognizing a request in a single entry in the queue as being a combination of a defer request and an invalidate request; and generating an invalidate bus request and a respective defer bus request to each of the plurality of request generation units that provided a cache line request with the common cache line in response to recognizing the single entry in the queue as being a combination of a defer request and an invalidate request.

8. The method according to claim 7, wherein receiving the plurality of requests into the request queue comprises multiplexing the invalidate and defer requests and requests from a plurality of memory interfaces.

9. The method according to claim 8, wherein multiplexing requests comprises:

assigning a priority to each of a source of the defer and invalidation requests and the plurality of memory interfaces; and selecting one of the source of the defer and invalidation requests and the plurality of memory interfaces in response to its corresponding priority.

10. The method according to claim 9, wherein assigning the priority comprises:

assigning a highest priority to the source of the defer and invalidation requests; and assigning a next highest priority to the plurality of memory interfaces according to a round robin algorithm.

11. The method according to claim 7, wherein recognizing the request as being a combination of a defer request and an invalidate request comprises analyzing a request code associated with the linked request.

12. The method according to claim 7, wherein generating multiple bus requests comprises:

parsing the request that is a combination of a defer request and an invalidate request in a single queue entry into multiple requests; and assembling the multiple requests into multiple bus requests.

13. A system for increasing effective capacity of a request queue, comprising:

a bus;

a plurality of processors coupled to the bus and adapted to provide cache line requests;

a cache memory arrangement;

means for determining whether a cache line referenced by a cache line request is present in the cache memory arrangement;

means for generating an invalidate request in response to a cache line in a cache line request being absent from the cache memory arrangement;

means for generating a defer request responsive to each cache line request, wherein a defer request indicates that the control circuit owns the cache line referenced by a cache line request;

means for recognizing each defer request and invalidate request that reference a common cache line;

means for combining each defer request and invalidate request that reference a common cache line into a single combined request;

means for storing each request and combined request; and means for generating multiple bus requests from a single request in the means for storing that is a combination of a defer request and an invalidate request, wherein the single request occupies a smaller space within the means for storing as compared to a space required for a single defer request and a single invalidate request;

a queue control circuit coupled to the queue and to the bus, the queue control circuit adapted to output to the bus at least one bus request for each queue entry, and in response to an output request in the queue being a combination of a defer request and an invalidate request, output to the bus an invalidate bus request and a respective defer bus request to each of the plurality of request generation units that provided a cache line request with the common cache line.

* * * * *